(No Model.)
H. G. FILSON.
FLOUR CHEST AND SIFTER.
No. 351,504. Patented Oct. 26, 1886.
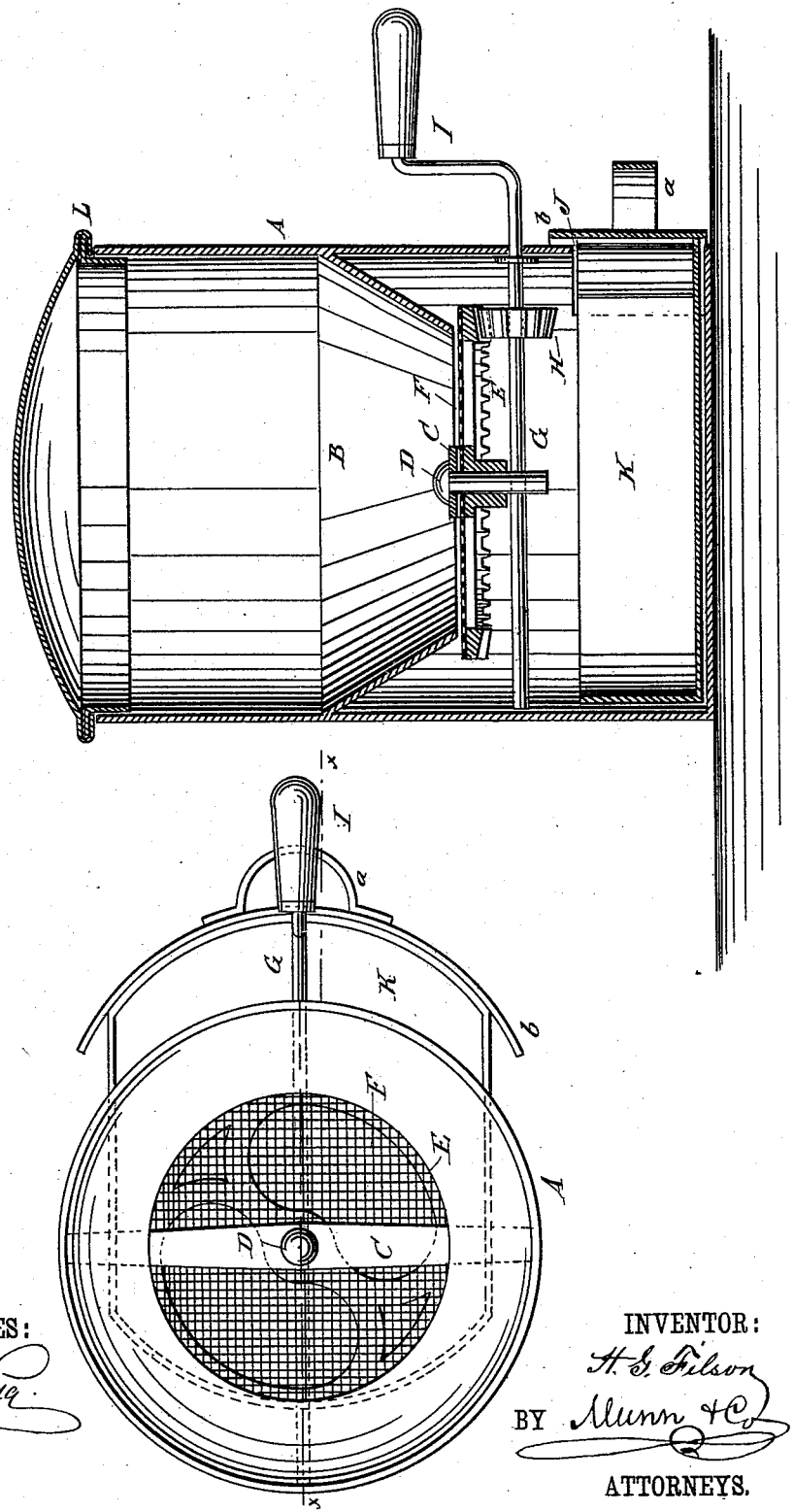
WITNESSES:
INVENTOR:
H. G. Filson
BY Munn & Co.
ATTORNEYS.

UNITED STATES PATENT OFFICE.

HIRAM G. FILSON, OF NEW CUMBERLAND, WEST VIRGINIA.

FLOUR CHEST AND SIFTER.

SPECIFICATION forming part of Letters Patent No. 351,504, dated October 26, 1886.

Application filed March 9, 1886. Serial No. 194,561. (No model.)

*To all whom it may concern:*

Be it known that I, HIRAM G. FILSON, of New Cumberland, in the county of Hancock and State of West Virginia, have invented a new and useful Improvement in Flour Chests and Sifters, of which the following is a specification, reference being had to the annexed drawings, forming a part thereof, in which—

Figure 1 is a plan view of my invention with the cover removed and the drawer partly drawn out. Fig. 2 is a vertical transverse section of the device, taken on line $xx$ in Fig. 1.

Similar letters of reference indicate corresponding parts in both figures of the drawings.

My invention consists in the construction and arrangement of parts hereinafter described and claimed.

In the receptacle A, near the middle thereof, is secured a conical hopper, B, provided with a bar, C, extending across the mouth thereof, which supports a central stud, D, upon which is journaled a beveled gear-wheel, E, provided with two or more arms, as shown in the plan view, Fig. 1, and arranged with its teeth downward, and carrying upon its upper surface a sieve, F, which is near the mouth of the hopper B and the cross-bar C, but not in contact therewith. The stud D is bored transversely below the boss of the bevel-wheel E, to receive and form a bearing for shaft G, which extends through the side of the receptacle A. The shaft G carries within the receptacle a pinion, H, which meshes with the bevel-wheel E. The end of the shaft G outside of the receptacle A is provided with a crank, I, by means of which it may be turned. In the side of the receptacle, at the bottom thereof, is formed an opening, J, in which is inserted a drawer, K, of the general form of the interior of the receptacle A. The drawer K is provided with a handle, $a$, by which it may be inserted into or removed from the receptacle. It is also provided with an auxiliary front, $b$, which overlaps the sides of the receptacle A around the opening J. To the top of the receptacle A is fitted a cover, L, which, together with the drawer-front, excludes air, dust, and vermin.

The receptacle A may be made of sheet metal, wood, or any other suitable material, and its form may be cylindrical, (like that shown in the drawings;) or, if preferred, it may be made rectangular.

The receptacle A is designed for containing a supply of flour, and when flour is needed for use the crank I is turned, thereby rotating the sieve F and discharging a quantity of sifted flour into the drawer K, from which it is taken for use. The cross-bar C not only serves as a support for the stud D, but also as a stirrer for breaking up the lumps of flour and causing it to be more rapidly sifted.

Having thus described my invention, what I claim as new, and desire to secure by Letters Patent, is—

A flour chest and sifter comprising the receptacle A, provided with the conical hopper B, the beveled wheel E, and sieve F, carried thereby, the cross bar C, secured to the hopper and supporting the wheel E, the shaft G, provided with the crank I, and the pinion H, carried by the shaft G and engaging the wheel E, substantially as herein shown and described.

HIRAM G. FILSON.

Witnesses:
MARION M. CULLEN,
JASPER M. PORTER.